United States Patent
Takami et al.

(10) Patent No.: US 8,758,497 B2
(45) Date of Patent: Jun. 24, 2014

(54) SPUTTERING TARGET OF SINTERED TI—NB BASED OXIDE, THIN FILM OF TI—NB BASED OXIDE, AND METHOD OF PRODUCING THE THIN FILM

(75) Inventors: Hideo Takami, Ibaraki (JP); Masataka Yahagi, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 300 days.

(21) Appl. No.: 13/258,137

(22) PCT Filed: Mar. 26, 2010

(86) PCT No.: PCT/JP2010/055329
§ 371 (c)(1),
(2), (4) Date: Oct. 21, 2011

(87) PCT Pub. No.: WO2010/110412
PCT Pub. Date: Sep. 30, 2010

(65) Prior Publication Data
US 2012/0024192 A1 Feb. 2, 2012

(30) Foreign Application Priority Data
Mar. 27, 2009 (JP) ................................. 2009-078264
Oct. 15, 2009 (JP) ................................. 2009-238112

(51) Int. Cl.
| | | |
|---|---|---|
| C09D 1/00 | (2006.01) | |
| C23C 14/08 | (2006.01) | |
| C04B 35/495 | (2006.01) | |
| C04B 35/462 | (2006.01) | |
| C04B 35/46 | (2006.01) | |
| C04B 35/499 | (2006.01) | |
| C04B 35/626 | (2006.01) | |

(52) U.S. Cl.
CPC ............. *C04B 35/495* (2013.01); *C04B 35/462* (2013.01); *C04B 35/46* (2013.01); *C04B 35/499* (2013.01); *C04B 35/6262* (2013.01); *C04B 2235/3232* (2013.01); *C04B 2235/3251* (2013.01); *C04B 2235/5436* (2013.01)
USPC ..................... 106/286.4; 423/594.8; 423/608; 423/610

(58) Field of Classification Search
CPC .... C04B 35/46; C04B 35/462; C04B 35/495; C04B 35/499; C04B 35/6262; C04B 2235/3251; C04B 2235/5436; C04B 2235/3232
USPC ..................... 106/286.4; 423/594.8, 608, 610
See application file for complete search history.

(56) References Cited

U.S. PATENT DOCUMENTS

| | | | |
|---|---|---|---|
| 5,681,632 A | 10/1997 | Kitaura et al. | |
| 6,362,084 B1 | 3/2002 | Nakamura et al. | |
| 6,528,442 B1 | 3/2003 | Kuwano et al. | |
| 6,755,948 B1 | 6/2004 | Fukuyo et al. | |
| 6,872,452 B2 | 3/2005 | Taninaka et al. | |
| 2003/0054178 A1 | 3/2003 | Anzaki et al. | |
| 2003/0091500 A1 | 5/2003 | Koinuma et al. | |
| 2004/0231981 A1* | 11/2004 | Takahashi et al. ....... | 204/298.13 |
| 2006/0159950 A1 | 7/2006 | Kunisada et al. | |
| 2008/0271988 A1 | 11/2008 | Hosoda et al. | |
| 2009/0086608 A1 | 4/2009 | Takaoka et al. | |
| 2010/0276276 A1 | 11/2010 | Takami et al. | |

FOREIGN PATENT DOCUMENTS

| | | |
|---|---|---|
| JP | 07-0233469 A | 9/1995 |
| JP | 11-104500 A | 4/1999 |
| JP | 2000-030297 A | 1/2000 |
| JP | 2002-206164 A | 7/2002 |
| JP | 2003-013201 A | 1/2003 |
| JP | 2004-158145 A | 6/2004 |
| JP | 2005-256087 A | 9/2005 |
| JP | 2006-079710 A | 3/2006 |
| JP | 2006-144052 A | 6/2006 |
| WO | 2009/078306 A1 | 6/2009 |

OTHER PUBLICATIONS

English translation of Kunisada (JP2005256087).*

* cited by examiner

*Primary Examiner* — Jun Li
(74) *Attorney, Agent, or Firm* — Howson & Howson LLP

(57) ABSTRACT

Provided is a sputtering target of sintered Ti—Nb based oxide, wherein the sputtering target consists of titanium (Ti), niobium (Nb), and remainder being oxygen and unavoidable impurities, and the atomic ratio of Ti and Nb is $0.39 \leq (Nb/(Ti+Nb)) \leq 0.79$. The sputtering target of sintered Ti—Nb based oxide has a high refractive index and a low extinction coefficient. Also provided is a thin film of Ti—Nb based oxide obtained by using the foregoing target, which enables high-rate deposition. The thin film has superior transmittance, is subject to minimal reduction and variation of reflectivity, and is useful as an interference film or a protective film of an optical information recording medium, or as a part of a constituent layer of an optical recording medium. The thin film can also be applied to a glass substrate; that is, it can be used as a heat reflecting film, an antireflection film, or an interference filter.

2 Claims, No Drawings

SPUTTERING TARGET OF SINTERED TI—NB BASED OXIDE, THIN FILM OF TI—NB BASED OXIDE, AND METHOD OF PRODUCING THE THIN FILM

BACKGROUND OF THE INVENTION

The present invention relates to a sputtering target of sintered Ti—Nb based oxide, which has a high refractive index and a low extinction coefficient and is capable of depositing a thin film at a high rate; a thin film of Ti—Nb based oxide; and a method of producing the foregoing thin film.

In recent years, technology of high-density optical recording disks, which are high-density optical information recording media capable of rewriting without using a magnetic head, has been developed, and these optical disks are being rapidly commercialized. In particular, CD-RW has become the most widespread phase-change optical disk ever since its release as a rewritable CD in 1977. The rewrite cycle of a CD-RW is approximately 1000 times.

Moreover, DVD-RW for use as a DVD has been developed and commercialized, and the layer structure of this disk is basically the same as or similar to a CD-RW. The rewrite cycle of a DVD-RW is approximately 1000 to 10000 times.

These are electronic parts being rapidly spread that are used for recording, reproducing, and rewriting information by irradiating optical beams and optically changing the transmittance, reflectance and the like of the recording material.

Generally speaking, a phase-change optical disk that is used as a CD-RW, a DVD-RW or the like has a four-layer structure, in which both sides of a recording thin layer of Ag—In—Sb—Te, Ge—Sb—Te or the like are sandwiched between protective layers of high-melting-point dielectric such as ZnS and $SiO_2$, and a reflective film of silver or silver alloy or aluminum alloy is further provided. Moreover, in order to increase the rewrite cycle, an interface layer is added between a memory layer and a protective layer as needed.

A reflective layer and a protective layer are required to have optical functions of increasing the difference in reflectance between the amorphous part and the crystal part of the recording layer, and additionally required to have humidity resistance of the recording thin film and a function for preventing deformation caused by heat, as well as a function of controlling the thermal conditions during recording (refer to Non-Patent Document 1).

Recently, in order to enable large-capacity and high-density recording, a single-sided/dual-layer optical recording medium has been proposed (refer to Patent Document 1). With Patent Document 1, there is a first information layer formed on a substrate 1 and a second information layer formed on a substrate 2 from the incident direction of the laser beam, and these layers are affixed to each other via an intermediate layer interposed therebetween so that these layers face each other.

In the foregoing case, the first information layer is configured from a recording layer and a first metal reflective layer, and the second information layer is configured from a first protective layer, a second protective layer, a recording layer, and a second metal reflective layer. In addition, layers such as a hard coat layer for protection against scratches, contamination and the like and a thermal diffusion layer may be arbitrarily formed. Moreover, various materials have been proposed as the protective layer, recording layer, reflective layer and other layers.

A protective layer of high-melting-point dielectric is required to be tolerant to the repeated thermal stress caused by heating and cooling so that the foregoing thermal effect does not affect the reflective film or other locations, and is also required to be thin and have low reflectivity and strength enough not to deteriorate. In this respect, the dielectric protective layer plays an important role. Moreover, needless to say, the recording layer, reflective layer, interference film layer and the like are similarly important in that they respectively exhibit their functions in the foregoing electronic parts such as CDs and DVDs.

The respective thin films in the foregoing multilayer structure are normally formed with the sputtering method. The sputtering method employs a principle where a substrate and a target as a positive electrode and a negative electrode are placed opposite each other, a high voltage is applied between the substrate and the target under an inert gas atmosphere to generate an electric field, the ionized electrons collide with the inert gas to form plasma, the positive ions in this plasma collide with the target (negative electrode) surface to discharge the constituent atoms of the target, and the extruded atoms adhere to the opposing substrate surface to form a film.

Under the foregoing circumstances, a target using titanium oxide ($TiO_x$) has been proposed as a sputtering target for forming a heat reflecting film and an antireflection film (refer to Patent Document 2). Here, in order to stabilize the discharge during sputtering, the specific resistance value is set to 0.35 $\Omega$cm or less so as to enable DC sputtering, and a film having a high refractive index is obtained thereby. Nevertheless, since the transmittance of the film is low, the measure of additionally introducing oxygen and achieving an oxygen content of 35 wt % or higher is adopted.

However, the introduction of oxygen entails the problem of deteriorating the deposition rate. Thus, attempts have been made for adding other substances in order to improve the deposition rate, but there were problems in the application as precision optics and electronic parts, for which films having a high refractive index and low absorption are required, particularly on the short wavelength side in the vicinity of 400 nm. Accordingly, the deterioration of the deposition rate in a titanium oxide target had not been resolved.

In addition, proposed is technology of forming a film essentially consisting of titanium oxide and niobium oxide or tantalum oxide as a dielectric film with high refractive index (refer to Patent Document 3). Nevertheless, in this case, the film is formed by using an alloy or mixture of titanium and niobium as the target, and performing (reactive) sputtering in an atmosphere containing oxygen gas. It is described that the refractive index of the obtained dielectric film with high refractive index is 2.5 or less. In the foregoing case, there are a problem in that stable film characteristics cannot be obtained due to the reactive sputtering, and a problem in that the extinction coefficient, which is deemed important in an optical recording medium, becomes high.

Meanwhile, also disclosed is technology of a titanium oxide-based (titanium oxide and niobium oxide) thin film having a refractive index of 2.5 or higher for use in an optical recording medium (refer to Patent Document 3). Here, a method of adding niobium oxide to reduce the resistivity and thereby enable DC sputtering is adopted, but this is still insufficient for usage as an optical recording medium.

In addition, there are patent documents that describe the combination among numerous oxides as to thin films for use in an optical recording medium (Patent Document 4, and Patent Document 5). These patent documents fail to describe the refractive index of the thin film for use in an optical recording medium, even though the refractive index is an important issue. Although various combinations are being considered, the refractive index will vary depending on the composition, and it is inferable that the refractive index has not been sufficiently examined. Moreover, it seems that, in these patent documents, a sputtering target is used to form the thin film, and the properties of the thin film are strongly affected by the component composition of the target and the nature of that target. However, these patent documents do not provide any disclosure thereof, and cannot be used as reference materials since they simply enumerate compositions and the disclosure of the technical contents is insufficient.

[Patent Document 1] Japanese Laid-Open Patent Publication No. 2006-79710
[Patent Document 2] Japanese Patent No. 3836163
[Patent Document 3] Japanese Laid-Open Patent Publication No. 2002-277630
[Patent Document 4] Japanese Laid-Open Patent Publication No. 2003-13201
[Patent Document 5] Japanese Laid-Open Patent Publication No. 2004-158145
[Patent Document 6] Japanese Laid-Open Patent Publication No. 2009-157990
[Non-Patent Document 1] Technical Journal "Kogaku" Volume 26, No. 1, Pages 9 to 15

SUMMARY OF INVENTION

In light of the foregoing problems, the main object of this invention is to improve the deposition rate of a sputtering target of sintered Ti-based oxide; and to obtain a thin film, which has a high refractive index, a low extinction coefficient, superior transmittance and low reflectivity, and is effective as an interference film or protective film of an optical information recording medium, by using the foregoing improved target and performing sputtering to form a thin film of Ti-based oxide on a substrate. Moreover, the thin film of the present invention can also be applied to a glass substrate, and the thin film can also be used as a heat reflecting film, antireflection film, and interference filter.

In order to achieve the foregoing object, as a result of intense study, the present inventors discovered that the addition of niobium oxide to titanium oxide is extremely effective in order to considerably improve the sputter deposition rate of a target of sintered Ti-based oxide, and to obtain a material capable of maintaining transmittance and preventing deterioration of reflectivity without impairing the characteristics of an interference film or a protective film of an optical information recording medium.

Based on the foregoing discovery, the present invention provides:

1) A sputtering target of sintered Ti—Nb based oxide, wherein the sputtering target consists of titanium (Ti), niobium (Nb), and remainder being oxygen and unavoidable impurities, and contains $TiNb_2O_7$ as an intermediate compound between $TiO_2$ and $Nb_2O_5$, and the atomic ratio of Ti and Nb is $0.39 \leq (Nb/(Ti+Nb)) \leq 0.79$; and 2) A sputtering target of sintered Ti—Nb based oxide, wherein the sputtering target consists of titanium (Ti), niobium (Nb), and remainder being oxygen and unavoidable impurities, and contains $TiNb_2O_7$ as an intermediate compound between $TiO_2$ and $Nb_2O_5$, and the atomic ratio of Ti and Nb is $0.57 \leq (Nb/(Ti+Nb)) \leq 0.75$.

The present invention additionally provides:

3) A thin film of Ti—Nb based oxide, wherein the thin film consists of titanium (Ti), niobium (Nb), and remainder being oxygen and unavoidable impurities, the atomic ratio of Ti and Nb is $0.39 \leq (Nb/(Ti+Nb)) \leq 0.79$, the refractive index in a wavelength region of 400 to 410 nm exceeds 2.5, and the extinction coefficient is 0.01 or less;

4) A thin film of Ti—Nb based oxide, wherein the thin film consists of titanium (Ti), niobium (Nb), and remainder being oxygen and unavoidable impurities, the atomic ratio of Ti and Nb is $0.46 \leq (Nb/(Ti+Nb)) \leq 0.79$, the refractive index in a wavelength region of 400 to 410 nm exceeds 2.5, and the extinction coefficient is 0.01 or less;

5) A thin film of Ti—Nb based oxide, wherein the thin film consists of titanium (Ti), niobium (Nb), and remainder being oxygen and unavoidable impurities, the atomic ratio of Ti and Nb is $0.57 \leq (Nb/(Ti+Nb)) \leq 0.75$, the refractive index in a wavelength region of 400 to 410 nm exceeds 2.5, and the extinction coefficient is 0.01 or less;

6) The thin film of Ti—Nb based oxide according to any one of 3) to 5) above, wherein the refractive index variation is 0.012 or less, and the extinction coefficient is 0.01 or less;

7) The thin film of Ti—Nb based oxide according to any one of 3) to 5) above, wherein the refractive index variation is 0.01 or less, and the extinction coefficient is 0.001 or less.

8) The thin film of Ti—Nb based oxide according to any one of 3) to 7) above, wherein the thin film is used as an optical interference film, a protective film, or a part of a constituent layer of an optical recording medium.

9) A method of producing the thin film of Ti—Nb based oxide according to any one of 3) to 8) above, wherein the thin film is deposited on a substrate by sputtering using a mixed sputtering gas of argon and oxygen in which 0.5% to 5% of oxygen is mixed.

As described above, the present invention is able to obtain a thin film of Ti—Nb based oxide having a high refractive index and a low extinction coefficient, and possess superior effect of being able to improve the rate of deposition of such a film as a result of sputtering the target of sintered Ti—Nb based oxide. The thin film obtained with the present invention yields a significant effect as a film or layer of an optical information recording medium. Moreover, the thin film of the present invention yields superior transmittance and low reflectivity, and is particularly effective as an interference film or protective film of an optical information recording medium.

A protective layer of high-melting-point dielectric is required to be tolerant to the repeated thermal stress caused by heating and cooling so that the foregoing thermal effect does not affect the reflective film or other locations, and is also required to be thin and have low reflectivity and strength enough not to deteriorate. The thin film of Ti—Nb based oxide according to the present invention comprises characteristics that can be applied to this kind of material.

DETAILED DESCRIPTION OF THE INVENTION

The sputtering target of sintered Ti—Nb based oxide according to the present invention consists of titanium (Ti), niobium (Nb), and remainder being oxygen and unavoidable impurities, and contains $TiNb_2O_7$ as an intermediate compound between $TiO_2$ and $Nb_2O_5$, and the atomic ratio of Ti and Nb is $0.39 \leq (Nb/(Ti+Nb)) \leq 0.79$. It is thereby possible to obtain a target of sintered Ti—Nb based oxide having a specific resistance of 100 Ωcm or less. The intermediate compound $TiNb_2O_7$ in the target can be confirmed by XRD measurement.

At the production stage of the target, the molar ratio of titanium as $TiO_2$ and niobium as $Nb_2O_5$ is adjusted to prepare the target having the foregoing atomic ratio. Then, $TiNb_2O_7$ as the intermediate compound of both oxides is generated. Accordingly, the oxygen content is the component ratio at the production stage of the target. There are cases where an oxygen defect occurs at the production stage of the target, but the oxygen defect becomes a factor of lowering the specific resistance, and is a preferable mode. Nevertheless, it goes without saying that the foregoing component ratio is not set in anticipation of such effect.

As a result of sputtering the foregoing target of the present invention, it is possible to obtain a thin film of Ti—Nb based oxide with roughly the same composition. Specifically, it is possible to obtain a thin film of Ti—Nb based oxide consisting of titanium (Ti), niobium (Nb), and remainder being oxygen and unavoidable impurities, wherein the atomic ratio of Ti and Nb is $0.39 \leq (Nb/(Ti+Nb)) \leq 0.79$.

Upon sputtering, since argon gas added with oxygen is generally used as the sputtering gas, there are cases where the composition will slightly differ between the target and the thin film, but this is not an essential problem. In other words, so as long as a thin film of Ti—Nb based oxide consisting of titanium (Ti), niobium (Nb), and remainder being oxygen and unavoidable impurities, wherein the atomic ratio of Ti and Nb is $0.39 \leq (Nb/(Ti+Nb)) \leq 0.79$, can be obtained, it is possible to achieve a thin film possessing the characteristics of the present invention.

The component composition ratio of titanium (Ti) and niobium (Nb) is of a complementary relationship, and similar characteristics can be obtained regardless of which element is the main component. Specifically, it is possible to yield the function as an optical interference film, a protective film or a thin film for use as a part of a constituent layer of an optical recording medium.

With the sputtering target of Ti—Nb based oxide according to the present invention, the lower limit of Nb/(Ti+Nb) is 0.39 and the upper limit is 0.79. If the lower limit is less than 0.39, the deposition rate will deteriorate and the addition effect is small. Moreover, if the upper limit exceeds 0.79, the refractive index of the sputtered film will decrease, and it will not be possible to obtain a thin film possessing the intended characteristics. The deposition rate tends to increase as the Nb amount is increased.

In order to further stabilize the refractive index variation of the thin film, it is preferable that the thin film of Ti—Nb based oxide consists of titanium (Ti), niobium (Nb), and remainder being oxygen and unavoidable impurities, and the atomic ratio of Ti and Nb is $0.46 \leq (Nb/(Ti+Nb)) \leq 0.79$.

If the lower limit is less than 0.46, the variation of the refractive index will increase, and the addition effect is small. Moreover, if the upper limit exceeds 0.79, the refractive index of the sputtered film will decrease, and it will not be possible to obtain a thin film possessing the intended characteristics. Variation of the refractive index tends to improve as the Nb amount is increased.

In order to further improve the amorphous stability of the thin film, it is preferable that the thin film of Ti—Nb based oxide consists of titanium (Ti), niobium (Nb), and remainder being oxygen and unavoidable impurities, and the atomic ratio of Ti and Nb is $0.57 \leq (Nb/(Ti+Nb)) \leq 0.75$. As the target to be used in the foregoing case, a target having the same component composition can be used and sputtered to obtain the foregoing thin film.

The reason why the amorphous stability of the thin film is improved is not necessarily clear, but it is thought to be because the intermediate compound $TiNb_2O_7$ will not crystallize easily. The existence of $TiNb_2O_7$ as an intermediate compound in the target is important in order to improve the amorphous stability of the thin film.

With these thin films, the refractive index in a wavelength region of 400 to 410 nm exceeds 2.5, and the extinction coefficient is 0.01 or less. Moreover, it is also possible to obtain thin films in which the extinction coefficient in a wavelength region of 400 to 410 nm is 0.005 or less, and even 0.001 or less.

The foregoing wavelength region of 400 to 410 nm is the wavelength region of a blue laser, and the refractive index exceeds 2.5 in this wavelength region as described above, but a higher refractive index is desirable. Moreover, it is possible to achieve an extinction coefficient of 0.01 or less, 0.005 or less, and even 0.001 or less, and a lower extinction coefficient is more suitable for achieving multiple layers. The thin film of Ti—Nb based oxide is useful as an interference film or a protective film, and is particularly useful for use in an optical recording medium.

With the sputtering in the foregoing case, a thin film having a low extinction coefficient can be obtained by introducing oxygen into the sputtering gas and adjusting the amount thereof. Upon producing a thin film of Ti—Nb based oxide, it is desirable to perform the sputtering by using a mixed sputtering gas of argon and oxygen in which 0.5% to 5% of oxygen is mixed. It is thereby possible to deposit a thin film of Ti—Nb based oxide with an even lower extinction coefficient on the substrate.

As described above, since oxygen is introduced into the argon sputtering gas to perform sputtering, there are cases where the sintered target of the present invention is similar to, but not the same as, the component composition of the thin film. Nevertheless, the difference in the component composition between the target and the thin film is minimal, and so as long as a thin film of Ti—Nb based oxide, in which the atomic ratio of Ti and Nb is $0.39 \leq (Nb/(Ti+Nb)) \leq 0.79$, can be obtained, it is possible to achieve a thin film possessing the characteristics of the present invention.

In order to increase the sputtering efficiency, the conductivity of the target is required, but the target of the present invention has such condition, and can be subject to DC (direct current) sputtering.

The better effect of preventing cracks can be achieved when the $TiNb_2O_7$ phases existing in the sintered sputtering target are dispersed evenly as fine particles. It could be said that the average grain size is desirably 20 μm or less. This sintered sputtering target can be used and sputtered in an argon gas atmosphere containing 0.5% to 5% of oxygen so as to form a thin film of Ti—Nb based oxide on the substrate.

In order to produce the target, it is desirable to use, as the raw materials, high-purity (normally 4N or higher) titanium oxide ($TiO_2$) having an average grain size of 10 μm or less (preferably having an average grain size of 1 μm or less), and high-purity (normally 4N or higher) niobium oxide ($Nb_2O_5$) powder having an average grain size of 10 μm or less (preferably having an average grain size of 5 μm or less). These are blended so as to achieve the composition ratio of the present invention. Subsequently, the powders of which components have been adjusted are mixed with a wet ball mill or a dry blender (mixer).

After the mixing, the mixed powder is filled in a carbon die and subsequently subject to hot press. The hot press conditions may be changed depending on the component composition, but the hot press is normally performed within a range of 900° C. to 1300° C. and bearing of 100 to 500 $kgf/cm^2$. Nevertheless, these conditions are representative conditions, and the selection thereof is made arbitrarily and there is no particular limitation. After sintering, the sintered compact is machined and finished into a target shape. A target prepared as described above is able to retain a relative density of 90% or higher.

Note that, after performing the mixing with the foregoing wet ball mill or dry blender (mixer), it is desirable that the mixed power is calcinated at 1000° C. to 1300° C., it is pulverized in a wet ball mill for 12 to 25 hours up to a grain size of 1 μm in order to obtain a slurry, the slurry is dried with a drier, and thereafter hot press is performed thereto. These processes are the recommended processes for obtaining a uniform target structure. It is thereby possible to obtain a sputtering target of sintered Ti—Nb based oxide with a predetermined composition.

EXAMPLES

The present invention is now explained with reference to the Examples and Comparative Examples. Note that these Examples are merely illustrative, and the present invention shall in no way be limited thereby. In other words, various modifications and other embodiments are covered by the present invention, and the present invention is limited only by the scope of its claims.

Examples 1 to 5

High-purity (4N) titanium oxide ($TiO_2$) having an average grain size of 1 μm and high-purity (4N) niobium oxide ($Nb_2O_5$) powder having an average grain size of 3 μm were prepared as the raw materials, and blended to achieve the composition ratio shown in the following Table. Next, the powders of which components had been adjusted were mixed with a dry blender and calcinated at 1000° C. Subsequently, this was further pulverized in a wet ball mill for approximately 20 hours up to a grain size of 1 μm so as to prepare a slurry.

Next, the slurry was dried with a drier, filled in a carbon die and hot-pressed. The hot press conditions were a temperature of 1200° C. and bearing of 300 kgf/cm². Any of the targets prepared as described above had a relative density of 90% or higher.

It was thereby possible to obtain the sputtering targets of sintered Ti—Nb based oxide with the predetermined composition shown in Table 1. As shown in Table 1, the specific resistance of the targets was 0.01 to 0.5 Ωcm. As a result of subjecting a sample collected from the foregoing sintered compact to XRD measurement, the existence of $TiNb_2O_7$ phases was confirmed.

TABLE 1

| | Target Composition | | Target Composition | | | | Specific | | Deposition |
|---|---|---|---|---|---|---|---|---|---|
| | $TiO_2$ (mol %) | $Nb_2O_5$ (mol %) | Ti (at %) | Nb (at %) | O (at %) | Nb/(Ti + Nb) | Resistance (Ωcm) | Sputtering Gas | Rate (Å/sec/kW) |
| Example 1 | 76 | 24 | 19.2 | 12.1 | Remainder | 0.39 | 0.5 | Ar—0.5%$O_2$ | 2.1 |
| Example 2 | 60 | 40 | 13.0 | 17.4 | | 0.57 | 0.01 | Ar—2%$O_2$ | 2.6 |
| Example 3 | 50 | 50 | 10.0 | 20.0 | | 0.67 | 0.02 | Ar—2%$O_2$ | 2.7 |
| Example 4 | 40 | 60 | 7.4 | 22.2 | | 0.75 | 0.05 | Ar—2%$O_2$ | 2.9 |
| Example 5 | 35 | 65 | 6.3 | 23.2 | | 0.79 | 0.03 | Ar—5%$O_2$ | 2.7 |
| Example 6 | 70 | 30 | 16.7 | 14.3 | | 0.46 | 0.1 | Ar—1%$O_2$ | 2.3 |
| Comparative Example 1 | 100 | 0 | 33.3 | 0.0 | | 0.00 | >100 | Ar—2%$O_2$ | 0.85 |
| Comparative Example 2 | 99.5 | 0.5 | 32.9 | 0.3 | | 0.01 | 80 | Ar—2%$O_2$ | 0.88 |
| Comparative Example 3 | 10 | 90 | 1.5 | 27.3 | | 0.95 | 1 | Ar—2%$O_2$ | 3.2 |
| Comparative Example 4 | 95 | 5 | 29.7 | 3.1 | | 0.10 | 1.5 | Ar—2%$O_2$ | 1.2 |

| | Film Composition | | | | | | | Refractive |
|---|---|---|---|---|---|---|---|---|
| | Ti (at %) | Nb (at %) | O (at %) | Nb/(Ti + Nb) | Refractive Index | Extinction Coefficient | Index Variation | |
| Example 1 | 19 | 12 | Remainder | 0.39 | 2.57 | 0.005 | 0.012 | |
| Example 2 | 13.1 | 17.5 | | 0.57 | 2.56 | 0.0001 | 0.007 | |
| Example 3 | 10.1 | 19.9 | | 0.66 | 2.55 | 0.0001 | 0.005 | |
| Example 4 | 7.5 | 22 | | 0.75 | 2.55 | 0.0001 | 0.005 | |
| Example 5 | 6.2 | 23.1 | | 0.79 | 2.54 | 0.0001 | 0.004 | |
| Example 6 | 16.6 | 14.2 | | 0.46 | 2.56 | 0.0001 | 0.01 | |
| Comparative Example 1 | 33.2 | 0 | | 0.00 | 2.57 | 0.0007 | 0.015 | |
| Comparative Example 2 | 32.9 | 0.3 | | 0.01 | 2.57 | 0.0006 | 0.015 | |
| Comparative Example 3 | 1.6 | 27.5 | | 0.95 | 2.48 | 0.001 | 0.001 | |
| Comparative Example 4 | 29.8 | 3.2 | | 0.10 | 2.6 | 0.0002 | 0.014 | |

Subsequently, the sputtering targets produced as described above were used to form a sputtered film on a glass substrate. These sputtering conditions were as shown in Table 1. Specifically, DC sputtering was performed in an Ar gas-$O_2$ (0.5% to 5%) gas atmosphere and at a gas pressure of 0.5 Pa, gas flow rate of 50 sccm, and sputtering power of 500 to 1000 w.

Consequently, it was possible to perform DC sputtering without any problem, and it was confirmed that the target possesses conductivity. Moreover, there was no abnormal discharge during the sputtering.

A sputtered film of 1 μm was formed on the glass substrate. The deposition rate and the film composition analyzed with EPMA are respectively shown in Table 1.

The refractive index and the extinction coefficient of the foregoing sputtered film were measured. The measurements were made with an ellipsometer by using a light wavelength of 405 nm.

Moreover, the sample that was sputter-deposited on the glass substrate was stored for 200 hours in 80° C. and 80% environment, and the refractive index variation was obtained from the difference in the refractive index before and after being stored in the foregoing environment.

The results are also shown in Table 1.

In Example 1, the atomic ratio of Ti and Nb was 0.39 for both the target composition and thin film composition, and was within the range of 0.39≤(Nb/(Ti+Nb))≤0.79 prescribed in the present invention, but it was the lower limit. Consequently, the specific resistance was low at 0.5 Ωcm, the deposition rate was 2.1 Å/sec/kW, and it was possible to obtain a sputtering target that achieved the object of the present invention. With the thin film, the refractive index was high at 2.57, the refractive index variation was slightly unstable at 0.012, and the extinction coefficient was slightly high at 0.005, but it was possible to form a favorable film as an interference film or a protective film for an optical recording medium.

In Example 2, the atomic ratio of Ti and Nb was 0.57 for both the target composition and thin film composition, and was within the range of 0.39≤(Nb/(Ti+Nb))≤0.79 prescribed in the present invention. Consequently, the specific resistance was low at 0.01 Ωcm, the deposition rate increased to 2.6 Å/sec/kW, and it was possible to obtain a sputtering target that achieved the object of the present invention. With the thin film, the refractive index was high at 2.56, the refractive index variation was stable at 0.007, and the extinction coefficient was low at 0.0001. It was possible to form a favorable film as an interference film or a protective film for an optical recording medium.

In Example 3, the atomic ratio of Ti and Nb was 0.67 for the target composition, and the atomic ratio of Ti and Nb was 0.66 for the thin film composition. Both were within the range of 0.39≤(Nb/(Ti+Nb))≤0.79 prescribed in the present invention.

Consequently, the specific resistance was low at 0.02 Ωcm, the deposition rate increased to 2.7 Å/sec/kW, and it was possible to obtain a sputtering target that achieved the object of the present invention. With the thin film, the refractive index was high at 2.55, the refractive index variation was stable at 0.005, and the extinction coefficient was low at 0.0001. It was possible to form a favorable film as an interference film or a protective film for an optical recording medium.

In Example 4, the atomic ratio of Ti and Nb was 0.75 for the target composition, and the atomic ratio of Ti and Nb was 0.75 for the thin film composition. Both were within the range of 0.39≤(Nb/(Ti+Nb))≤0.79 prescribed in the present invention.

Consequently, the specific resistance was low at 0.05 Ωcm, the deposition rate increased to 2.9 Å/sec/kW, and it was possible to obtain a sputtering target that achieved the object of the present invention. With the thin film, the refractive index was high at 2.55, the refractive index variation was stable at 0.005, and the extinction coefficient was low at 0.0001. It was possible to form a favorable film as an interference film or a protective film for an optical recording medium.

In Example 5, the atomic ratio of Ti and Nb was 0.79 for the target composition, and the atomic ratio of Ti and Nb was 0.79 for the thin film composition. Both were within the range of 0.39≤(Nb/(Ti+Nb))≤0.79 prescribed in the present invention.

Consequently, the specific resistance was low at 0.03 Ωcm, the deposition rate increased to 2.7 Å/sec/kW, and it was possible to obtain a sputtering target that achieved the object of the present invention. With the thin film, the refractive index was high at 2.54, the refractive index variation was stable at 0.004, and the extinction coefficient was low at 0.0001. It was possible to form a favorable film as an interference film or a protective film for an optical recording medium.

In Example 6, the atomic ratio of Ti and Nb was 0.46 for the target composition, and the atomic ratio of Ti and Nb was 0.46 for the thin film composition. Both were within the range 0.39≤(Nb/(Ti+Nb))≤0.79 prescribed in the present application. Consequently, the specific resistance was low at 0.1 Ωcm, the deposition rate increased to 2.3 Å/sec/kW, and it was possible to obtain a sputtering target that achieved the object of the present invention. With the thin film, the refractive index was high at 2.56, the refractive index variation was stable at 0.01, and the extinction coefficient was low at 0.0001. It was possible to form a favorable film as an interference film or a protective film for an optical recording medium.

Consequently, the specific resistance was low at 0.1 Ωcm, the deposition rate increased to 2.3 Å/sec/kW, and it was possible to obtain a sputtering target that achieved the object of the present invention. With the thin film, the refractive index was high at 2.56, the refractive index variation was stable at 0.01, and the extinction coefficient was low at 0.0001. It was possible to form a favorable film as an interference film or a protective film for an optical recording medium.

Comparative Examples 1 to 4

As with Example 1, high-purity (4N) titanium oxide ($TiO_2$) having an average grain size of 1 μm and high-purity (4N) niobium oxide ($Nb_2O_5$) powder having an average grain size of 3 μm were prepared as the raw materials, and blended to achieve the composition ratio shown in the foregoing Table.

Next, the powders of which components had been adjusted were mixed with a dry blender and calcinated at 1000° C. Subsequently, this was further pulverized in a wet ball mill for approximately 20 hours up to a grain size of 1 μm so as to prepare a slurry.

Next, the slurry was dried with a drier, filled in a carbon die and hot-pressed. The hot press conditions were a temperature of 1000° C. to 1300° C. and bearing of 300 kgf/cm². Any of the targets prepared as described above had a relative density of 90% or higher.

It was thereby possible to obtain the sputtering targets of sintered Ti—Nb based oxide with the predetermined composition shown in Table 1. As shown in Table 1, the specific resistance of the targets was 1 to 100 (and more) Ωcm.

Subsequently, the sputtering targets produced as described above were used to form a sputtered film on a glass substrate. There sputtering conditions were as shown in Table 1. Specifically, DC sputtering was performed in an Ar gas-$O_2$ (2%) gas atmosphere and at a gas pressure of 0.5 Pa, gas flow rate of 50 sccm, and sputtering power of 500 to 1000 w. Consequently, although DC sputtering was possible, the deposition rate was considerably slow. The comprehensive evaluation of the Comparative Examples is provided below.

A sputtered film of 500 Å was formed on the glass substrate by sputtering. The deposition rate and the film composition analyzed with EPMA are respectively shown in Table 1. In addition, the refractive index and the extinction coefficient of the foregoing sputtered film were measured. The measurements were made with an ellipsometer by using a light wavelength of 405 nm. The results are also shown in Table 1.

In Comparative Example 1, used is a titanium oxide target that does not contain niobium (Nb). The specific resistance of this target was high at >100 Ωcm, and the deposition rate decreased considerably at 0.85 Å/sec/kW. It was not possible to obtain a sputtering target that achieved the object of the present invention.

In Comparative Example 2, the atomic ratio of Ti and Nb was 0.01, and deviated from the range of 0.39≤(Nb/(Ti+Nb))≤0.79 prescribed in the present invention. Consequently, the specific resistance was high at 80 Ωcm, the deposition rate was low at 0.88 Å/sec/kW, and it was not possible to obtain a sputtering target that achieved the object of the present invention.

In Comparative Example 3, the atomic ratio of Ti and Nb was 0.95, and deviated from the range of 0.39≤(Nb/(Ti+Nb))≤0.79 prescribed in the present invention. Consequently, the specific resistance was 1 Ωcm, and the deposition rate was somewhat high at 3.2 Å/sec/kW, but since the refractive index was low at 2.48, it was not possible to obtain a sputtering target that achieved the object of the present invention.

In Comparative Example 4, the atomic ratio of Ti and Nb was 0.1, and deviated from the range of 0.39≤(Nb/(Ti+Nb))≤0.79 prescribed in the present invention. The specific resistance was 1.5 Ωcm, the deposition rate was low at 1.2 Å/sec/kW, and it was not possible to obtain a sputtering target that achieved the object of the present invention.

(Summary of Examples and Comparative Examples)

Upon comparing the foregoing Examples and Comparative Examples, all of those within the scope of the present invention had a high and stable refractive index and a low extinction coefficient. Similarly, with respect to those in which the respective components of the sputtering target satisfied the conditions of the present invention, the specific resistance of the target was 100 Ωcm or less in all cases, the deposition rate was high, and favorable results were yielded in that the amorphous nature of the film was stable.

The present invention relates to a sputtering target of sintered Ti—Nb based oxide and a thin film of Ti—Nb based oxide that was subject to sputter deposition using the foregoing target. The thin film obtained in the present invention has a high refractive index and a low extinction coefficient, and can be used as a film or a layer of an optical information recording medium of electronic components such as a Blu-Ray Disc (registered trademark).

Moreover, the thin film of the present invention yields superior transmittance and low reflectivity, and is particularly effective as an interference film or protective film of an optical information recording medium, or as a part of a constituent layer of an optical recording medium. A protective layer of high-melting-point dielectric is tolerant to the repeated thermal stress caused by heating and cooling, and the foregoing thermal effect does not affect the reflective film or other locations. And, this is effective as a dielectric protective layer which is required to be thin and have low reflectivity and strength enough not to deteriorate.

In addition, a material possessing the foregoing characteristics can be applied to architectural glass, glass for automobiles, CRT, and flat displays; that is, it can be used as a heat ray reflective film, antireflection film, and interference filter.

The invention claimed is:

1. A sputtering target of sintered Ti—Nb based oxide, wherein the sputtering target consists of titanium (Ti), niobium (Nb), and remainder being oxide and unavoidable impurities, $TiNb_2O_7$ exists as an intermediate compound between $TiO_2$ and $Nb_2O_5$ confirmable by XRD measurement, the atomic ratio of Ti and Nb is 0.39≤(Nb/(Ti+Nb))≤0.79, relative density is 90% or more, and specific resistance is 0.5 Ωcm or less.

2. A sputtering target of sintered Ti—Nb based oxide according to claim 1, wherein the atomic ratio of Ti and Nb is 0.57≤(Nb/(Ti+Nb))≤0.75.

* * * * *